United States Patent
Kebler et al.

(10) Patent No.: US 11,070,386 B2
(45) Date of Patent: Jul. 20, 2021

(54) CONTROLLING AN AGGREGATE NUMBER OF UNIQUE PIM JOINS IN ONE OR MORE PIM JOIN/PRUNE MESSAGES RECEIVED FROM A PIM NEIGHBOR

(71) Applicant: Juniper Networks, Inc., Sunnyvale, CA (US)

(72) Inventors: Robert W. Kebler, Newburyport, MA (US); Rahul Unnikrishnan, Herndon, VA (US); Venkata Lakshmana Murthy Varahabhotla, Herndon, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 46 days.

(21) Appl. No.: 16/677,510

(22) Filed: Nov. 7, 2019

(65) Prior Publication Data
US 2021/0144019 A1 May 13, 2021

(51) Int. Cl.
*H04L 12/18* (2006.01)
*H04L 12/801* (2013.01)

(52) U.S. Cl.
CPC ........ *H04L 12/185* (2013.01); *H04L 12/1886* (2013.01); *H04L 47/15* (2013.01)

(58) Field of Classification Search
CPC .... H04L 12/185; H04L 12/1886; H04L 47/15
See application file for complete search history.

(56) References Cited

U.S. PATENT DOCUMENTS

| | | | | |
|---|---|---|---|---|
| 7,558,219 B1* | 7/2009 | Aggarwal | ............... | H04L 12/18 370/256 |
| 7,808,993 B2* | 10/2010 | Zwiebel | .................. | H04L 45/16 370/392 |
| 9,356,789 B1* | 5/2016 | Peter | ....................... | H04L 69/03 |
| 10,020,952 B1* | 7/2018 | Cai | ..... | H04L 12/1886 |
| 2002/0196808 A1* | 12/2002 | Karri | .................. | H04Q 11/0478 370/468 |
| 2006/0146857 A1* | 7/2006 | Naik | ...................... | H04L 47/20 370/432 |
| 2007/0058627 A1* | 3/2007 | Smith | ..................... | H04L 45/16 370/390 |
| 2007/0147374 A1* | 6/2007 | Lee | ....................... | H04L 47/829 370/390 |

(Continued)

OTHER PUBLICATIONS

Boers, A. "The Protocol Independent Multicast (PIM) Join Attribute Format" Nov. 2008. RFC 5384. Ietf.org.*

(Continued)

*Primary Examiner* — Stephen J Clawson
(74) *Attorney, Agent, or Firm* — John C. Pokotylo; Pokotylo Patent Services

(57) ABSTRACT

The potential problem of too many unique protocol independent multicast (PIM) joins (corresponding to unique (Source, Group) combinations) in PIM join/prune messages being received by a router may be solved by controlling (e.g., limiting) a number of unique PIM joins to be sent to the router from a downstream device. This may be accomplished, for example, by communicating a limit (or multiple different limits) from a PIM device to one or more downstream PIM neighbors. For example, the limit may be encoded in a PIM Hello message (e.g., as an Option Type-Length-Value (TLV)).

20 Claims, 10 Drawing Sheets

(56) References Cited

U.S. PATENT DOCUMENTS

| | | | | |
|---|---|---|---|---|
| 2007/0153790 | A1* | 7/2007 | Boers | H04L 45/04 370/390 |
| 2008/0205396 | A1* | 8/2008 | Dakshinamoorthy | H04L 12/1886 370/390 |
| 2009/0316697 | A1* | 12/2009 | Dakshinamoorthy | H04L 12/1886 370/390 |
| 2017/0214538 | A1* | 7/2017 | Johnsen | H04L 12/18 |

OTHER PUBLICATIONS

Varahabhotla et al, "Controlling Protocol Independent Multicast (PIM) Join/Prune Messages From a Downstream PIM Neighbor Using a PIM Join/Prune Response(s) From an Upstream PIM Neighbor," Specification, Claims, Abstract, Drawings from co-pending U.S. Appl. No. 16/790,640, filed Feb. 13, 2020.

\* cited by examiner

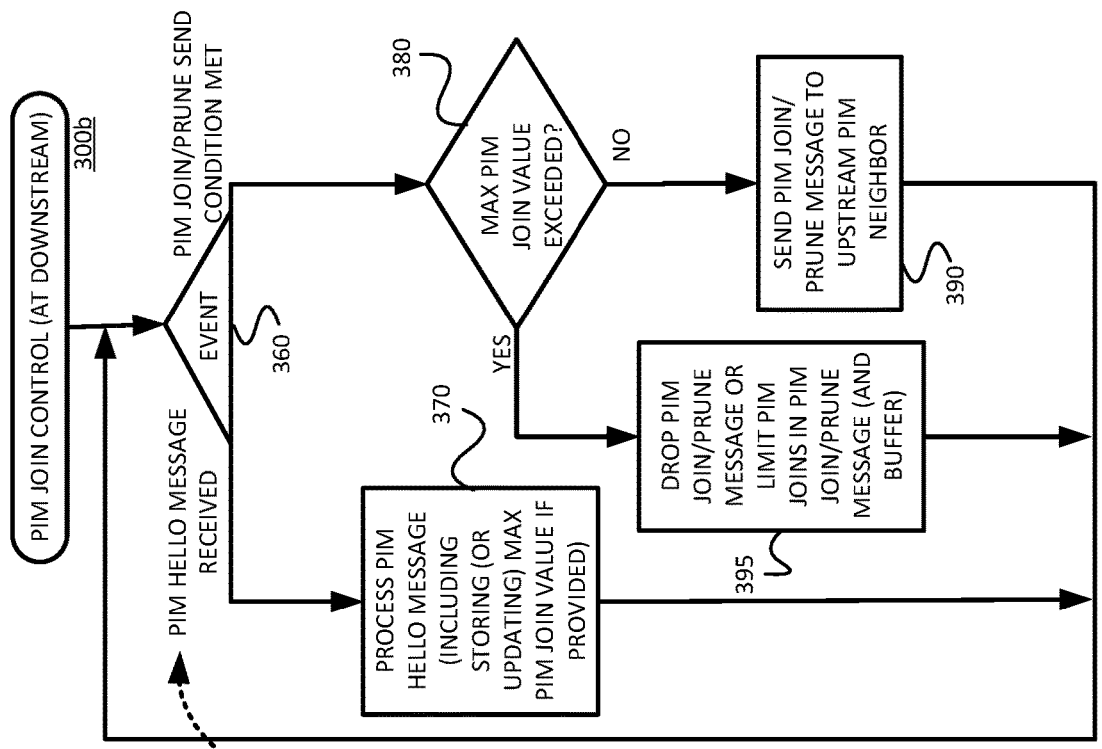
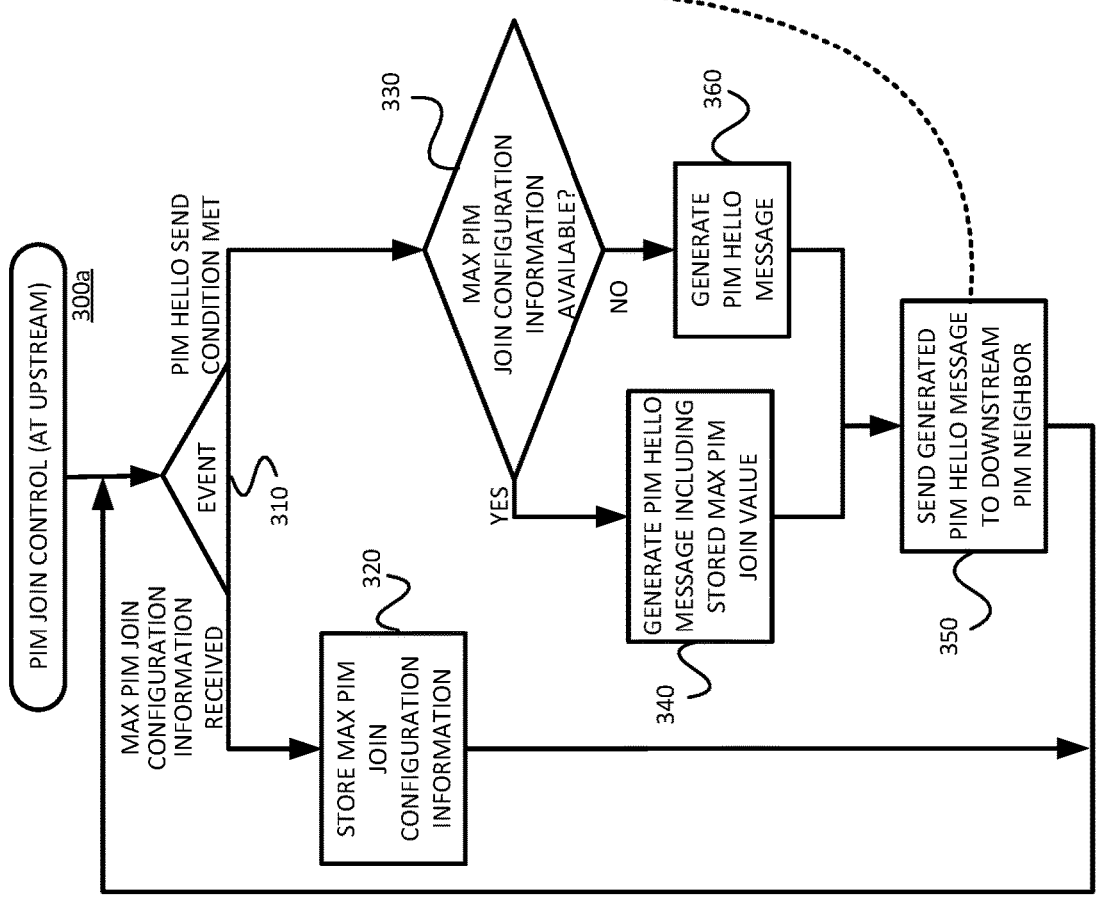
FIGURE 3B
FIGURE 3A

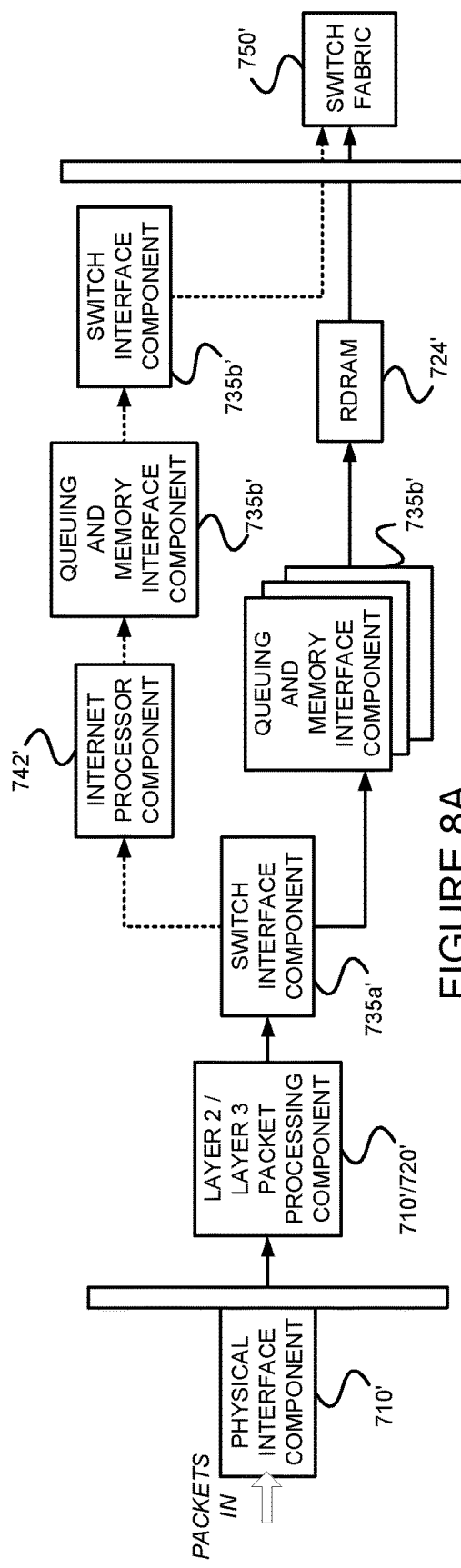
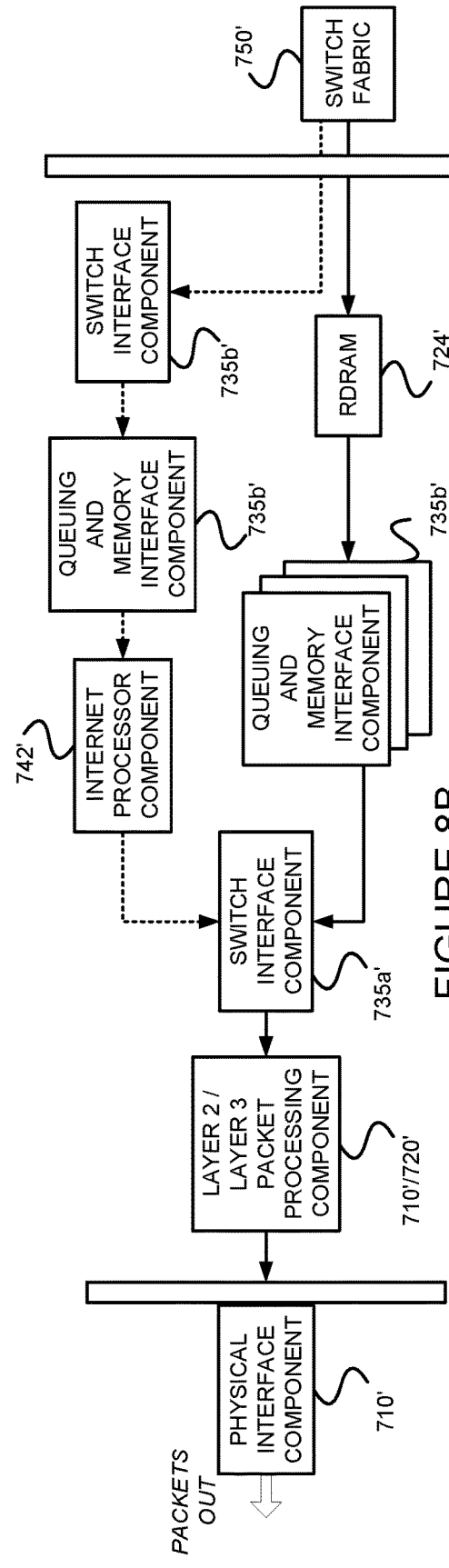
FIGURE 8A
FIGURE 8B

CONTROLLING AN AGGREGATE NUMBER OF UNIQUE PIM JOINS IN ONE OR MORE PIM JOIN/PRUNE MESSAGES RECEIVED FROM A PIM NEIGHBOR

§ 1. BACKGROUND OF THE INVENTION

§ 1.1 Field of the Invention

The present description concerns communications networks. More specifically, the present description concerns problems that may arise in a communications network domain employing the protocol independent multicast (PIM) sparse mode (SM) protocol.

§ 1.2 Background Information

§ 1.2.1 PIM-SM

Although the protocol independent multicast (PIM) sparse mode (SM) protocol is well understood by those skilled in the art, it is introduced here for the reader's convenience. The document "Protocol Independent Multicast—Sparse Mode (PIM-SM): Protocol Specification (Revised)," Request for Comments 7761 (Internet Engineering Task Force, March 2016) (referred to as "RFC 7761" and incorporated herein by reference) specifies a multicast routing protocol that can use underlying unicast routing information base or a separate multicast-capable routing information base. It builds unidirectional shared trees rooted at a rendezvous point (RP) per multicast group (G), and optionally creates shorted path trees (SPTs) per multicast source (S).

A PIM-SM domain uses reverse-path forwarding (RPF) to create a path from a data source (S) to the receiver requesting the data. When a receiver issues an explicit join request, an RPF check is triggered. A (*,G) PIM join message (namely, the receiver wants to joint multicast group (G), regardless of the source (*)) is sent toward the RP from the receiver's designated router (DR). (By definition, this message is actually called a join/prune message, but for clarity in this description, may be called either a PIM join message or a PIM prune message, depending on its context.) The join message is multicast, hop by hop, upstream to the ALL-PIM-ROUTERS group (224.0.0.13 for IPv4, or ff02::d for IPv6) by means of each router's RPF interface until it reaches the RP. The RP router receives the (*,G) PIM join message and adds the interface on which it was received to the outgoing interface list (OIL) of the rendezvous-point tree (RPT) forwarding state entry. This builds the RPT connecting the receiver with the RP. The RPT remains in effect, even if no active sources generate traffic.

The (*,G) or (S,G) entries are state information used for forwarding unicast or multicast packets. S is the source IP address, G is the multicast group address, and * represents any source sending to group G. Routers keep track of the multicast forwarding state for the incoming and outgoing interfaces for each source, group (S,G) combination, including any source (*,G).

When a source becomes active, the source DR encapsulates multicast data packets into a PIM register message and sends them by means of unicast to the RP router. If the RP router has interested receivers in the PIM-SM domain, it sends a PIM join message toward the source to build a shortest-path tree (SPT) back to the source. The source sends multicast packets out (e.g., on a local area network (LAN)). The source DR encapsulates the packets in a PIM register message and forwards the message toward the RP router by means of unicast. The RP router receives PIM register messages back from the source, and thus adds a new source to its distribution tree, keeping track of sources in a PIM table. Once an RP router receives packets natively (with S,G), it sends a register stop message to stop receiving the register messages by means of unicast.

In actual application, many receivers with multiple SPTs are involved in a multicast traffic flow. To illustrate the process, consider the multicast traffic from the RP router to one receiver. In such a case, the RP router begins sending multicast packets down the RPT toward the receiver's DR for delivery to the interested receivers. When the receiver's DR receives the first packet from the RPT, the DR sends a PIM join message toward the source DR to start building an SPT back to the source. When the source DR receives the PIM join message from the receiver's DR, it starts sending traffic down all SPTs. When the first multicast packet is received by the receiver's DR, the receiver's DR sends a PIM prune message to the RP router to stop duplicate packets from being sent through the RPT. In turn, the RP router stops sending multicast packets to the receiver's DR, and sends a PIM prune message for this source over the RPT toward the source DR to halt multicast packet delivery to the RP router from that particular source.

If the RP router receives a PIM register message from an active source but has no interested receivers in the PIM sparse-mode domain, it still adds the active source into the PIM table. However, after adding the active source into the PIM table, the RP router sends a register stop message. The RP router discovers the active source's existence and no longer needs to receive advertisement of the source (which utilizes resources).

As should be appreciated from the foregoing, some major characteristics of PIM-SM include the following:

Routers with downstream receivers join a PIM-SM tree through an explicit join message.

PIM-SM RPs are the routers where receivers meet sources.

Sources announce their existence to one or more RPs, and receivers query RPs to find multicast sessions.

Once receivers get content from sources through the RP, the last-hop router (the router closest to the receiver) can optionally remove the RP from the shared distribution tree (*,G) if the new source-based tree (S,G) is shorter. Receivers can then get content directly from the source (rather than via the RP).

The transitional aspect of PIM-SM from a shared tree rooted by the RP, to source-based tree, is one of the major features of PIM, because it prevents overloading the RP or surrounding core links.

The RP router serves as the information exchange point for the other routers. All routers in a PIM-SM domain provide mapping to an RP router. It is the only router that needs to know the active sources for a domain; the other routers just need to know how to reach the RP. In this way, the RP matches receivers with sources. As shown in FIG. 1B, the RP router is downstream from the source and forms one end of the shortest-path tree (SPT). As also shown, the RP router is upstream from the receiver and thus forms one end of the RPT.

The benefit of using the RP as the information exchange point is that it reduces the amount of state in non-RP routers. No network flooding is required to provide non-RP routers information about active sources.

RPs can be learned by any one of (A) static configuration, (B) anycast RP, (C) auto-RP, or (D) bootstrap router.

§ 1.2.2 Problems Associated With PIM-SM Join/Prune Messages

FIG. 2 is an example topology 200 used to illustrate potential problems associated with PIM-SM Join/Prune messages. In the example topology 200, each of the hosts 210 can be, for example, a multicast source or a multicast receiver. Assume that at least some of the hosts 210 are multicast receivers sending IGMP report messages. Further, CE1, CE2, . . . , CEn 220 are the first hop routers connecting to provider edge device PE1 230. Both the CEs and PE1 are configured with the address of an RP. As shown in FIG. 2, the RP may be, for example, another PE connected to the core (RPa 240a), connected with another provider edge device (PE2) via another customer edge device (CEm) (RPb 240b), or connected with one of customer edge devices (CEn) that is also connected with PE1 230 (RPc 240c).

Assume that the CEs are getting IGMP join/prune message(s) for a specific multicast group. Each of the CEs converts a received IGMP report/leave message(s) to a PIM join/prune message(s) by including group (G) (and source (S), if PIM-Source-Specific Mode (PIM-SSM is) used) information from the IGMP report/leave message(s) in the PIM join/prune message(s), and sends the PIM join/prune message(s) to the PE. There may be a 1-to-1, n-to-1, or 1-to-n relationship between the number of received IGMP report/leave message(s) and the number of generated PIM join/prune message(s). Further, per section 4.9.5 of RFC 7761, a PIM join/prune message may include one or more unique multicast groups (G), each including one or more unique multicast sources (S) (referred to as "a unique (S,G) combination") to be joined and/or pruned. Note that any source is typically denoted with a "*". Thus, a single PIM join/prune message may include zero or more unique "PIM joins" (and zero or more unique "PIM prunes"), each of which is associated with a unique (S,G) combination.

The number of PIM joins that each CE will pack in a single PIM join/prune message and sent to PE1 can be variable. In general, each CE will pack as many as possible of the PIM joins derived from received IGMP report/leave message(s) into a PIM join/prune message. Unfortunately, a problem can arise since PE1 can handle only a finite number (e.g., X) of PIM join(s). For example, suppose that the CEs, as an aggregate, are sending to PE1, in one or more PIM join/prune messages, X+Y PIM joins corresponding to X+Y unique (S,G) combinations. So, some (Y) of the PIM joins will not be able to be processed. For example, if there is a PIM join/prune flood in a scaled environment on PE1, a PIM send/receive process running on PE1 might become busy. This may, in turn, cause high routing protocol processing (e.g., by a routing protocol daemon) and/or CPU utilizations which may, in turn, adversely impact other protocols running on PE1. This, in turn, may cause thrashing of membership in a PIM neighborship, with unpredictable (or difficult to predict) effects. For example, high CPU utilization can cause PIM neighborship to flap and in turn lose PIM joins received from the neighbor. Further, even if the receiving router could restrict the PIM joins to some number, doing so still wouldn't solve certain problems. For example, if the receiving router starts discarding some PIM joins, then there would likely be random PIM join(s), corresponding to unique (S,G) combination(s), being periodically timed out. This would cause thrashing of the PIM joins.

Further, there is currently no way to include filters which can applied on a PE1-CEx interface to restrict only the PIM join/prune flood. Note that although a filter for the PIM control packet (224.0.0.13) can be applied, such a filter would cause the PE1-CEx PIM neighborship to flap, which would likely cause more damage to customer than if the PE1-CEx PIM neighborship was never established.

In view of the foregoing, it would be useful to avoid the potential problem of too many unique PIM joins (corresponding to unique (S,G) combinations) in PIM join/prune messages being received by a router (e.g., a provider edge router (PE)).

§ 2. SUMMARY OF THE INVENTION

The potential problem of too many unique PIM joins (corresponding to unique (S,G) combinations) in PIM join/prune messages being received by a router may be solved by controlling (e.g., limiting) a number of unique PIM joins to be sent to the router from a downstream device. In some example methods consistent with the present description, this may be accomplished by communicating a limit (or multiple different limits) from a PIM device to one or more downstream PIM neighbors. In at least some example methods consistent with the present description, the limit is encoded in a PIM Hello message (e.g., as an Option Type-Length-Value (TLV)). Thus, the potential problem of too many unique PIM joins (corresponding to unique (S,G) combinations) in PIM join/prune messages being received by a router may be solved by providing a computer-implemented method for use on a device running a protocol independent multicast (PIM) protocol. Such a computer-implemented method may include: (a) receiving PIM join control limit configuration information; (b) storing the received PIM join control limit configuration information; (c) generating a PIM Hello message including the stored PIM join control limit configuration information; and (d) sending the generated PIM Hello message to a PIM neighbor.

In at least some of the example methods, the PIM neighbor is downstream from the device.

In at least some of the example methods, the stored PIM join control limit configuration information is included in the PIM Hello message as a type-length-value (TLV).

In at least some of the example methods, the PIM group control limit is a maximum number of unique PIM (source, group) combinations that are to be carried in one or more PIM join/prune messages.

At least some of the example methods further include: (e) receiving second PIM join control limit configuration information, wherein the second PIM join control limit configuration is value which is different than the PIM join control limit configuration information; (f) storing the received second PIM join control limit configuration information; (g) generating a second PIM Hello message including the stored second PIM join control limit configuration information; and (h) sending the generated second PIM Hello message to a second PIM neighbor different than the PIM neighbor. In at least some such example methods, the PIM join control limit is a maximum unique PIM join value, and wherein the second PIM join control limit is a second maximum unique PIM join value. In at least some such methods, the device is a provider edge router, the PIM neighbor is a first customer edge router and the second PIM neighbor is a second customer edge router.

When used in a system including the device and the PIM neighbor, the example computer-implemented may further include: (e) receiving, by the PIM neighbor, the generated PIM Hello message; (f) receiving, by the PIM neighbor, one or more IGMP messages; (g) generating, using information in the one or more IGMP messages, at least one PIM join/prune message, wherein a number of unique PIM joins, in the generated at least one PIM join/prune message and any earlier PIM join/prune messages sent from the PIM neighbor to the device, is limited by the PIM join control limit; and (h) sending the generated at least one PIM join/prune message from the PIM neighbor to the PIM device.

Any of the foregoing example methods may be implemented on one more PIM device, such as on upstream and/or downstream PIM neighbor devices.

BRIEF DESCRIPTION OF THE DRAWINGS

FIGS. 3A and 3B are flow diagrams of an example method for limiting a number of unique PIM joins received, in a manner consistent with the present description.

FIGS. 8A and 8B illustrate example packet forwarding operations of the example distributed ASICs of FIG. 7.

DETAILED DESCRIPTION

Figure 1A:
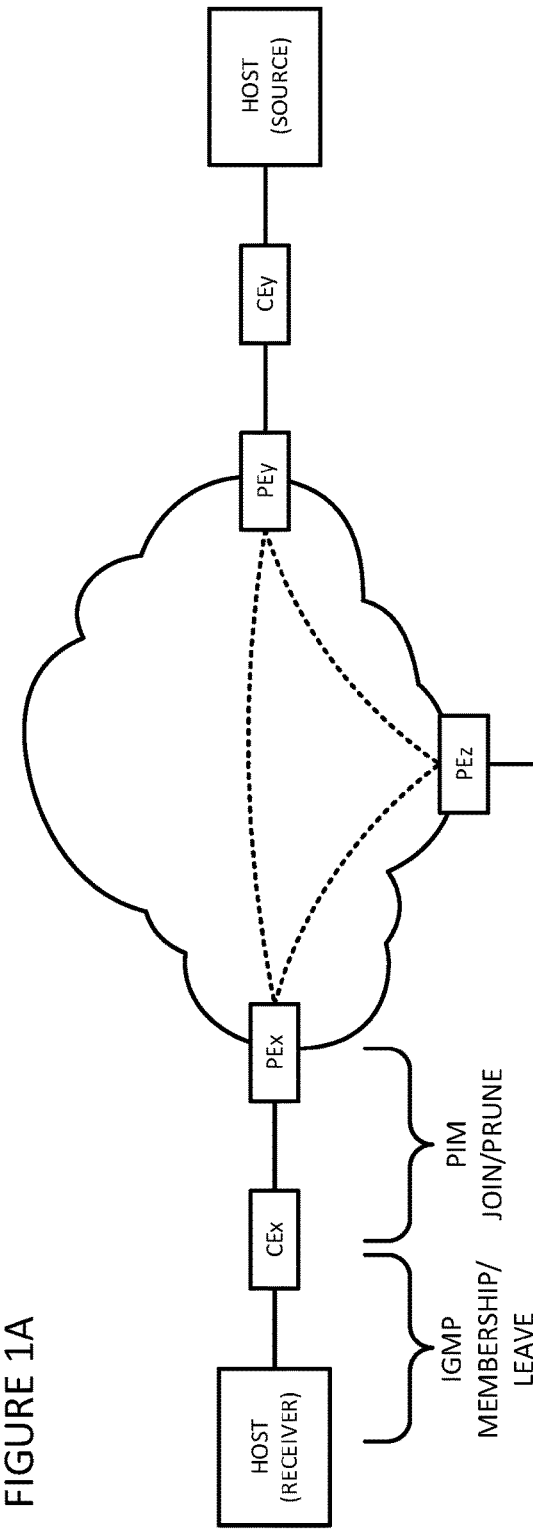
FIG. 1A is an example network used to illustrate components in an example PIM-SM network environment.
Figure 1B:
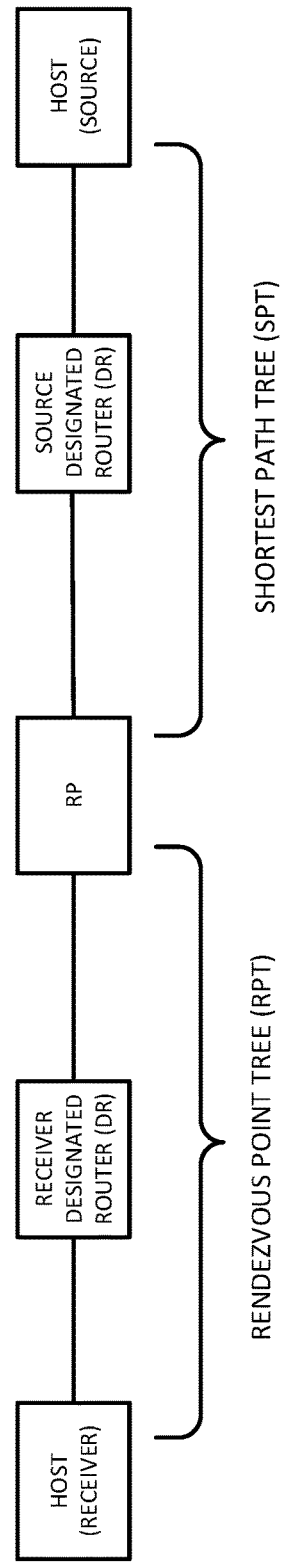
FIG. 1B is a simplified example illustrating components in an example PIM-SM network environment.

The present description may involve novel methods, apparatus, message formats, and/or data structures for limiting a number of unique PIM joins received. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 4.1 Example Methods

FIGS. 3A and 3B are flow diagrams of an example method 300 (including 300a and 300b) for limiting a number of unique PIM joins received, in a manner consistent with the present description. Referring first to FIG. 3A, different branches of the example method 300a are performed in response to the occurrence of different events. (Event block 310) For example, if maximum PIM join configuration information is received (e.g., via a user interface), the example method 300a stores the received maximum PIM join configuration information. (Block 320) Referring back to event block 310, if a condition for sending a PIM Hello is met, the example method 300a determines whether or not maximum PIM join configuration is available (e.g., previously stored). (Decision 330) If maximum PIM join configuration is available (Decision 330, YES), the example method 300a generates a PIM Hello message including the stored maximum PIM join configuration information (Block 340) and sends the generated PIM Hello message to a (e.g., downstream) PIM neighbor (Block 350). If, on the other hand, maximum PIM join configuration is not available (Decision 330, NO), the example method 300a generates a PIM Hello message (not including any maximum PIM join configuration information) (Block 360) and sends the generated PIM Hello message to a (e.g., downstream) PIM neighbor (Block 350).

Referring now to FIG. 3B, different branches of the example method 300b are performed in response to the occurrence of different events. (Event block 360) For example, if a PIM Hello message is received (e.g., from an upstream neighbor) (Recall block 350 of FIG. 3A.), the example method 300b processes the received PIM Hello message. (Block 370) If the received PIM Hello message includes a maximum PIM join value (e.g., in an option TLV), this processing may include storing the maximum PIM join value, or updating (e.g., replacing) a previously stored maximum PIM join value. Referring back to event block 360, if a condition for sending a PIM join/prune message is met, the example method 300b determines whether or not the number of unique PIM joins in the PIM join/prune message, when aggregated with any other unique PIM joins included in earlier PIM join/prune messages, exceeds the maximum PIM join value (if previously received and stored). (Decision 380) If the maximum PIM join configuration value is not exceeded (Decision 380, NO), the example method 300b sends the PIM join/prune message to a (e.g., upstream) PIM neighbor (Block 390). If, on the other hand, the maximum PIM join value is exceeded (Decision 380, YES), the example method 300b drops (or otherwise does not generate, or does not send) a PIM join/prune message (even though a local condition for sending it was met), or limits the number of PIM joins in the PIM join/prune message such that the limit is not violated (Block 395). Note that any PIM joins not sent may be buffered at the downstream device. In this way, if the limit is raised, or if the count is decreased (e.g., due to PIM prune(s)), the buffered PIM join(s) can be sent in one or more PIM join/prune messages.

The example method(s) 300a/300b may be run on routers. For example, the upstream router may be a provider edge router (PE) and the downstream PIM neighbor may be a customer edge router (CE).

The maximum PIM join value may be associated with a specific device (e.g., a specific upstream router). In such a case, the method 300b uses the maximum PIM join value for a specific upstream device when a condition for sending a PIM join/prune message to the specific upstream device is met.

§ 4.1.1 Example Ways to Encode the PIM Join/Prune Control Information

Figure 4:
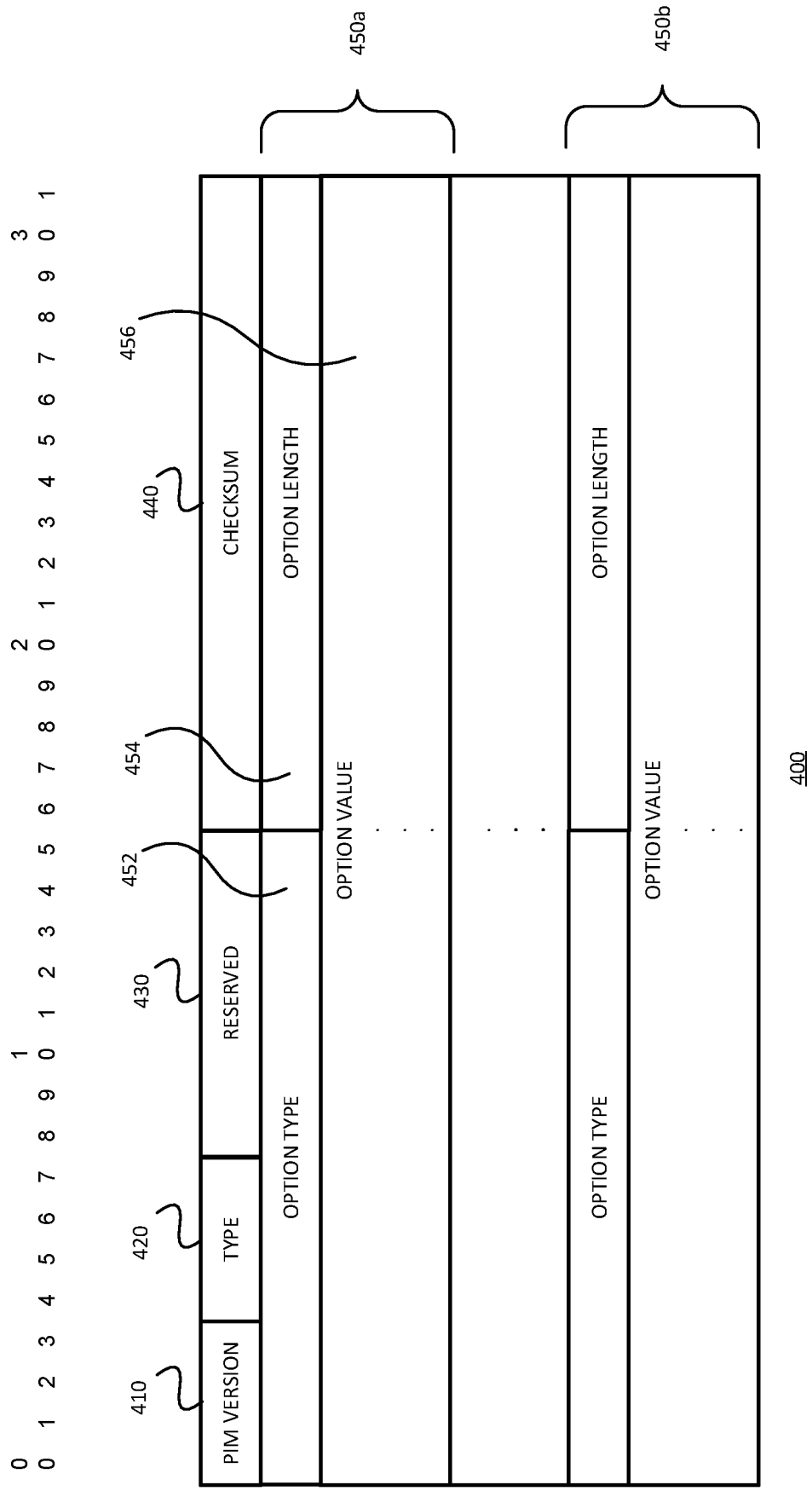
FIG. 4 illustrates an example data structure, such as PIM Hello packet for example, for carrying join limit information in a manner consistent with the present description.

FIG. 4 illustrates an example data structure, such as PIM Hello packet 400 for example, for carrying PIM join limit information (e.g., a maximum PIM join value) in a manner consistent with the present description. Per section 4.9.2 of RFC 7761, a PIM Hello message is sent periodically by routers on all interfaces. Per section 4.9 of RFC 7761, the packet format for PIM control messages (including PIM Hello messages) have IP protocol number 103. PIM messages are either unicast (e.g., Registers and Register-Stop) or multicast with TTL1 to the 'ALL-PIM-ROUTERS' group (e.g., Join/Prune, Asserts). The source address used for unicast messages is a domain-wide reachable address; the source address used for multicast messages is the link-local address of the interface on which the message is being sent. The IPv4 'ALL-PIM-ROUTERS' group is '224.0.0.13'. The IPv6 'ALL-PIM-ROUTERS' group is 'ff02::d'.

The PIM header in the PIM Hello, which is also common to all PIM messages, includes a 4-bit PIM Version field 410, a 4-bit Type field 420, an 8-bit Reserved field 430, and a 16-bit Checksum field 440. The PIM Version number in RFC 7761 is 2. The value in the Type field 420 for a PIM Hello is 0. The bits in the Reserved field 430 are set to zero on transmission and ignored upon receipt. The value in the Checksum field 440 is a standard IP checksum.

The PIM Hello message 400 may include one or more Option Type-Length-Values (TLVs) 450. One of these Option TLVs 450 may carry the stored maximum PIM join configuration information (value). For example, the Option TLV 450a may include a Maximum PIM join type value (to be set by the Internet Assigned Numbers Authority (IANA)) in option type field 452, a value in the option length field 454 corresponding to the length of the option value, and the maximum PIM join value itself in the option value field 456. Of course, this TLV need not be the first Option TLV 450a; it may be any one of a number of Option TLVs 450 carried in the PIM Hello message 400.

Thus, the example method 300 provides an administrator with an option to throttle/control a number of unique PIM joins (corresponding to a unique number of (S,G) combinations) in one or more PIM Join/Prune messages. A downstream router may use the maximum PIM join value to control (e.g., drop, limit, etc.) a number of unique PIM joins in its PIM join/prune messages so that the receiving router is not overwhelmed by them.

§ 4.2 Example Apparatus

Figure 5:
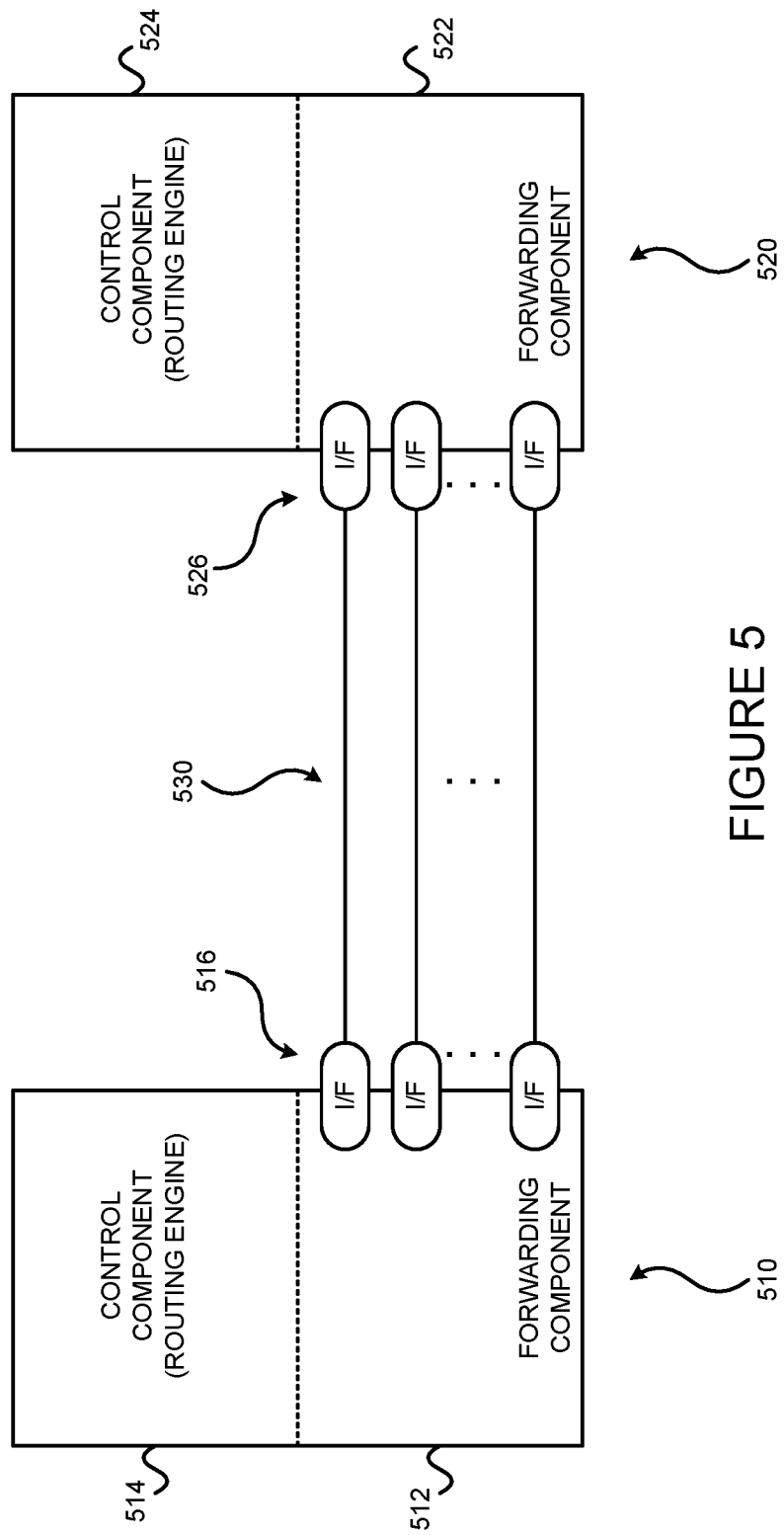
FIG. 5 illustrates an example environment including two systems coupled via communications links.

FIG. 5 illustrates two data forwarding systems 510 and 520 coupled via communications links 530. The links may be physical links or "wireless" links. The data forwarding systems 510, 520 may be routers for example. If the data forwarding systems 510, 520 are example routers, each may include a control component (e.g., a routing engine) 514, 524 and a forwarding component 512, 522. Each data forwarding system 510, 520 includes one or more interfaces 516, 526 that terminate one or more communications links 530. Assuming the device 510 is a customer edge device (CE) and the device 520 is a provider edge device (PE), the example method 300 described above may be implemented in the control component 524 of device 520.

As just discussed above, and referring to FIG. 6, some example routers 600 include a control component (e.g., routing engine) 610 and a packet forwarding component (e.g., a packet forwarding engine) 690.

The control component 610 may include an operating system (OS) kernel 620, routing protocol process(es) 630, label-based forwarding protocol process(es) 640, interface process(es) 650, user interface (e.g., command line interface) process(es) 660, and chassis process(es) 670, and may store routing table(s) 639, label forwarding information 645, and forwarding (e.g., route-based and/or label-based) table(s) 680. As shown, the routing protocol process(es) 630 may support routing protocols such as the routing information protocol ("RIP") 631, the intermediate system-to-intermediate system protocol ("IS-IS") 632, the open shortest path first protocol ("OSPF") 633, the enhanced interior gateway routing protocol ("EIGRP") 634 and the boarder gateway protocol ("BGP") 635, and the label-based forwarding protocol process(es) 640 may support protocols such as BGP 635, the label distribution protocol ("LDP") 636 and the resource reservation protocol ("RSVP") 637. One or more components (not shown) may permit a user 665 to interact with the user interface process(es) 660. Similarly, one or more components (not shown) may permit an outside device to interact with one or more of the router protocol process(es) 630, the label-based forwarding protocol process(es) 640, the interface process(es) 650, and the chassis process(es) 670, via SNMP 685, and such processes may send information to an outside device via SNMP 685.

The packet forwarding component 690 may include a microkernel 692, interface process(es) 693, distributed ASICs 694, chassis process(es) 695 and forwarding (e.g., route-based and/or label-based) table(s) 696.

Figure 6:
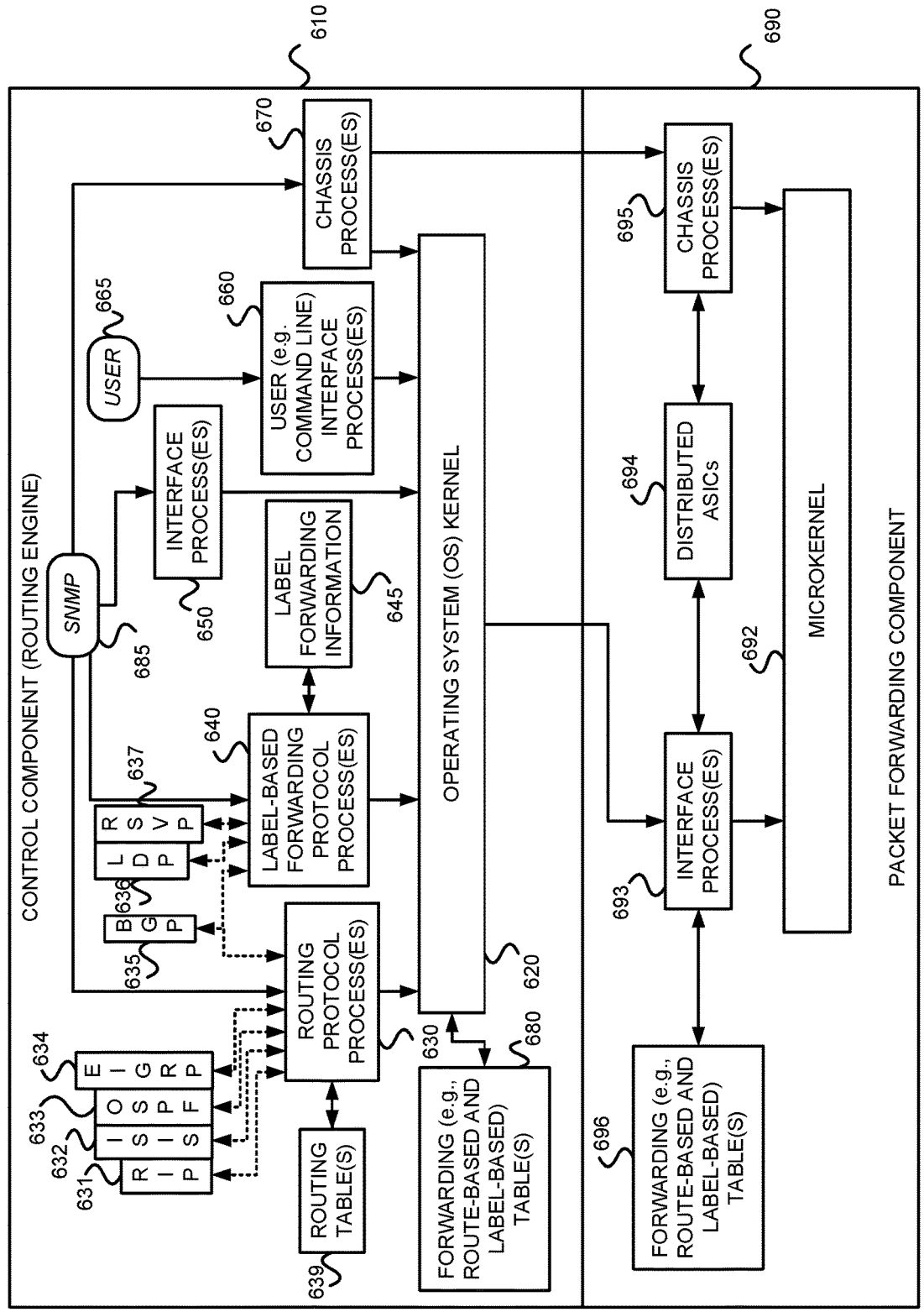
FIG. 6 is a block diagram of an example router on which one or more aspects of the present disclosure may be implemented.

In the example router 600 of FIG. 6, the control component 610 handles tasks such as performing routing protocols, performing label-based forwarding protocols, control packet processing, etc., which frees the packet forwarding component 690 to forward received packets quickly. That is, received control packets (e.g., routing protocol packets and/or label-based forwarding protocol packets) are not fully processed on the packet forwarding component 690 itself, but are passed to the control component 610, thereby reducing the amount of work that the packet forwarding component 690 has to do and freeing it to process packets to be forwarded efficiently. Thus, the control component 610 is primarily responsible for running routing protocols and/or label-based forwarding protocols, maintaining the routing tables and/or label forwarding information, sending forwarding table updates to the packet forwarding component 690, and performing system management. The example control component 610 may handle routing protocol packets, provide a management interface, provide configuration management, perform accounting, and provide alarms. The processes 630, 640, 650, 660 and 670 may be modular, and may interact with the OS kernel 620. That is, nearly all of the processes communicate directly with the OS kernel 620. Using modular software that cleanly separates processes from each other isolates problems of a given process so that such problems do not impact other processes that may be running. Additionally, using modular software facilitates easier scaling.

Still referring to FIG. 6, the example OS kernel 620 may incorporate an application programming interface ("API") system for external program calls and scripting capabilities. The control component 610 may be based on an Intel PCI platform running the OS from flash memory, with an alternate copy stored on the router's hard disk. The OS kernel 620 is layered on the Intel PCI platform and establishes communication between the Intel PCI platform and processes of the control component 610. The OS kernel 620 also ensures that the forwarding tables 696 in use by the packet forwarding component 690 are in sync with those 680 in the control component 610. Thus, in addition to providing the underlying infrastructure to control component 610 software processes, the OS kernel 620 also provides a link between the control component 610 and the packet forwarding component 690.

Referring to the routing protocol process(es) 630 of FIG. 6, this process(es) 630 provides routing and routing control functions within the platform. In this example, the RIP 631, ISIS 632, OSPF 633 and EIGRP 634 (and BGP 635) protocols are provided. Naturally, other routing protocols (e.g., PIM, PIM-SM, etc.) may be provided in addition, or alternatively. Similarly, the label-based forwarding protocol process(es) 640 provides label forwarding and label control functions. In this example, the LDP 636 and RSVP 637 (and BGP 635) protocols are provided. Naturally, other label-based forwarding protocols (e.g., MPLS) may be provided in addition, or alternatively. In the example router 600, the routing table(s) 639 is produced by the routing protocol process(es) 630, while the label forwarding information 645 is produced by the label-based forwarding protocol process(es) 640.

Still referring to FIG. 6, the interface process(es) 650 performs configuration of the physical interfaces (Recall, e.g., 516 and 526 of FIG. 5.) and encapsulation.

The example control component 610 may provide several ways to manage the router. For example, it 610 may provide a user interface process(es) 660 which allows a system operator 665 to interact with the system through configuration, modifications, and monitoring. The SNMP 685 allows SNMP-capable systems to communicate with the router platform. This also allows the platform to provide necessary SNMP information to external agents. For example, the SNMP 685 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 610, thereby avoiding slowing traffic forwarding by the packet forwarding component 690.

Although not shown, the example router 600 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 660 via a console port, an auxiliary port, and/or a management Ethernet port The packet forwarding component 690 is responsible for properly outputting received packets as quickly as possible. If there is no entry in the forwarding table for a given destination or a given label and the packet forwarding component 690 cannot perform forwarding by itself, it 690 may send the packets bound for that unknown destination off to the control component 610 for processing. The example packet forwarding component 690 is designed to perform Layer 2 and Layer 3 switching, route lookups, and rapid packet forwarding.

As shown in FIG. 6, the example packet forwarding component 690 has an embedded microkernel 692, interface process(es) 693, distributed ASICs 694, and chassis process(es) 695, and stores a forwarding (e.g., route-based and/or label-based) table(s) 696. The microkernel 692 interacts with the interface process(es) 693 and the chassis process(es) 695 to monitor and control these functions. The interface process(es) 692 has direct communication with the OS kernel 620 of the control component 610. This communication includes forwarding exception packets and control packets to the control component 610, receiving packets to be forwarded, receiving forwarding table updates, providing information about the health of the packet forwarding component 690 to the control component 610, and permitting configuration of the interfaces from the user interface (e.g., CLI) process(es) 660 of the control component 610. The stored forwarding table(s) 696 is static until a new one is received from the control component 610. The interface process(es) 693 uses the forwarding table(s) 696 to look up next-hop information. The interface process(es) 693 also has direct communication with the distributed ASICs 694. Finally, the chassis process(es) 695 may communicate directly with the microkernel 692 and with the distributed ASICs 694.

In the example router 600, the example method 300a/300b consistent with the present disclosure may be implemented in one of the routing protocol processes 630.

Figure 7:
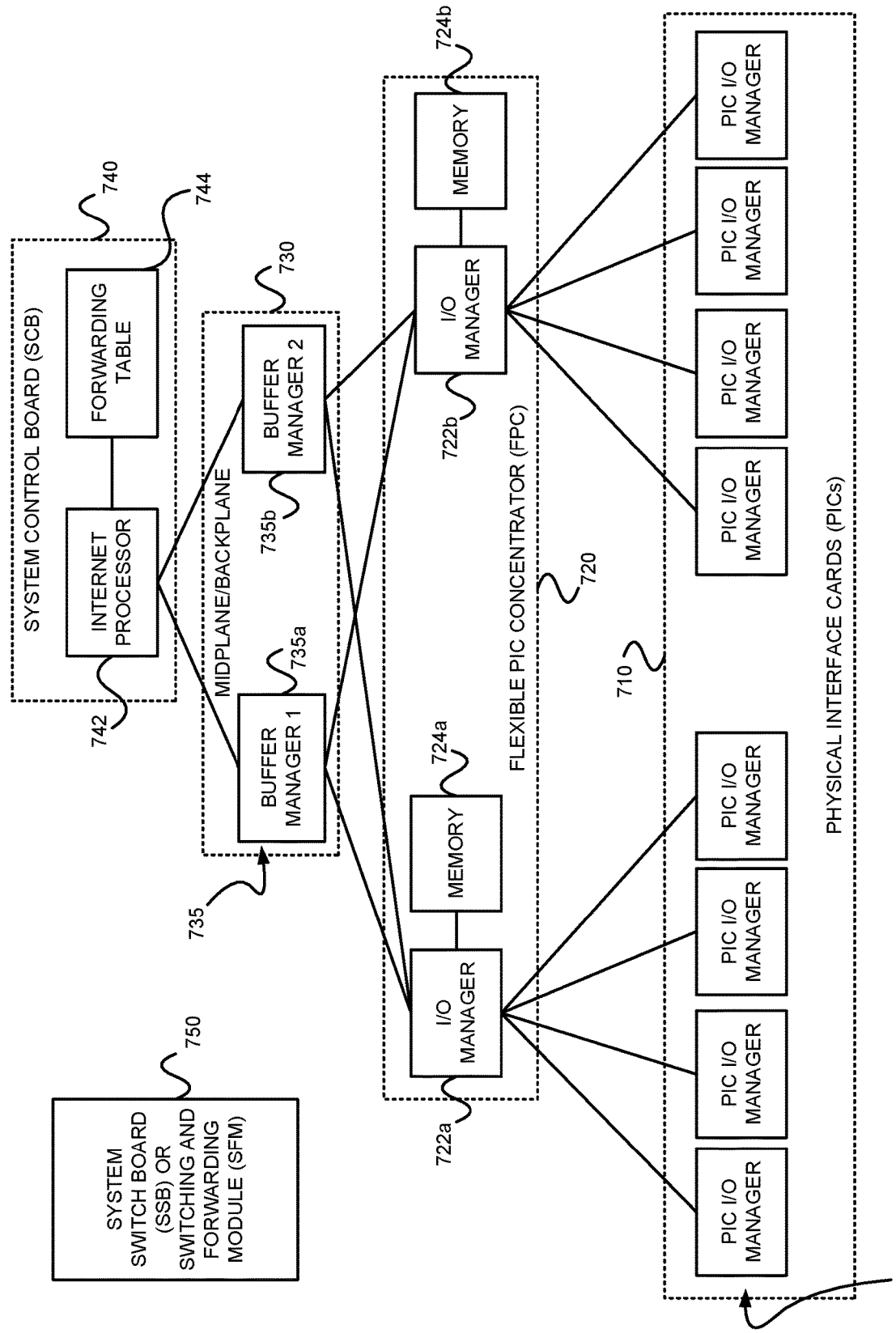
FIG. 7 is a block diagram of example distributed application specific integrated circuits ("ASICs") that may be provided in the example router of FIG. 6.

Referring back to distributed ASICs 694 of FIG. 6, FIG. 7 is an example of how the ASICS may be distributed in the packet forwarding component 690 to divide the responsibility of packet forwarding. As shown in FIG. 7, the ASICs of the packet forwarding component 690 may be distributed on physical interface cards ("PICs") 710, flexible PIC concentrators ("FPCs") 720, a midplane or backplane 730, and a system control board(s) 740 (for switching and/or forwarding). Switching fabric is also shown as a system switch board ("SSB"), or a switching and forwarding module ("SFM") 750. Each of the PICs 710 includes one or more PIC I/O managers 715. Each of the FPCs 720 includes one or more I/O managers 722, each with an associated memory 724. The midplane/backplane 730 includes buffer managers 735a, 735b. Finally, the system control board 740 includes an internet processor 742 and an instance of the forwarding table 744 (Recall, e.g., 696 of FIG. 6).

Still referring to FIG. 7, the PICs 710 contain the interface ports. Each PIC 710 may be plugged into an FPC 720. Each individual PIC 710 may contain an ASIC that handles media-specific functions, such as framing or encapsulation. Some example PICs 710 provide SDH/SONET, ATM, Gigabit Ethernet, Fast Ethernet, and/or DS3/E3 interface ports.

An FPC 720 can contain from one or more PICs 710, and may carry the signals from the PICs 710 to the midplane/backplane 730 as shown in FIG. 7.

The midplane/backplane 730 holds the line cards. The line cards may connect into the midplane/backplane 730 when inserted into the example router's chassis from the front. The control component (e.g., routing engine) 610 may plug into the rear of the midplane/backplane 730 from the rear of the chassis. The midplane/backplane 730 may carry electrical (or optical) signals and power to each line card and to the control component 610.

The system control board 740 may perform forwarding lookup. It 740 may also communicate errors to the routing engine. Further, it 740 may also monitor the condition of the router based on information it receives from sensors. If an abnormal condition is detected, the system control board 740 may immediately notify the control component 610.

Referring to FIGS. 7, 8A and 8B, in some exemplary routers, each of the PICs 710, 610' contains at least one I/O manager ASIC 715 responsible for media-specific tasks, such as encapsulation. The packets pass through these I/O ASICs on their way into and out of the router. The I/O manager ASIC 715 on the PIC 710, 610' is responsible for managing the connection to the I/O manager ASIC 722 on the FPC 720, 620', managing link-layer framing and creating the bit stream, performing cyclical redundancy checks (CRCs), and detecting link-layer errors and generating alarms, when appropriate. The FPC 720 includes another I/O manager ASIC 722. This ASIC 722 takes the packets from the PICs 710 and breaks them into (e.g., 74-byte) memory blocks. This FPC I/O manager ASIC 722 sends the blocks to a first distributed buffer manager (DBM) 735a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 735a' manages and writes packets to the shared memory 724 across all FPCs 720. In parallel, the first DBM ASIC 735a' also extracts information on the destination of the packet and passes this forwarding-related information to the Internet processor 742/642'. The Internet processor 742/642' performs the route lookup using the forwarding table 744 and sends the information over to a second DBM ASIC 735b'. The Internet processor ASIC 742/642' also collects exception packets (i.e., those without a forwarding table entry) and sends them to the control component 610. The second DBM ASIC 735b' then takes this information and the 74-byte blocks and forwards them to the I/O manager ASIC 722 of the egress FPC 720/620' (or multiple egress FPCs, in the case of multicast) for reassembly. (Thus, the DBM ASICs 735a' and 735b' are responsible for managing the packet memory 724 distributed across all FPCs 720/620', extracting forwarding-related information from packets, and instructing the FPC where to forward packets.)

The I/O manager ASIC 722 on the egress FPC 720/620' may perform some value-added services. In addition to incrementing time to live ("TTL") values and re-encapsulating the packet for handling by the PIC 710, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 722 on the egress FPC 720/620' may be responsible for receiving the blocks from the second DBM ASIC 735b', incrementing TTL values, queuing a pointer to the packet, if necessary, before applying CoS rules, re-encapsulating the blocks, and sending the encapsulated packets to the PIC I/O manager ASIC 715.

Figure 9:
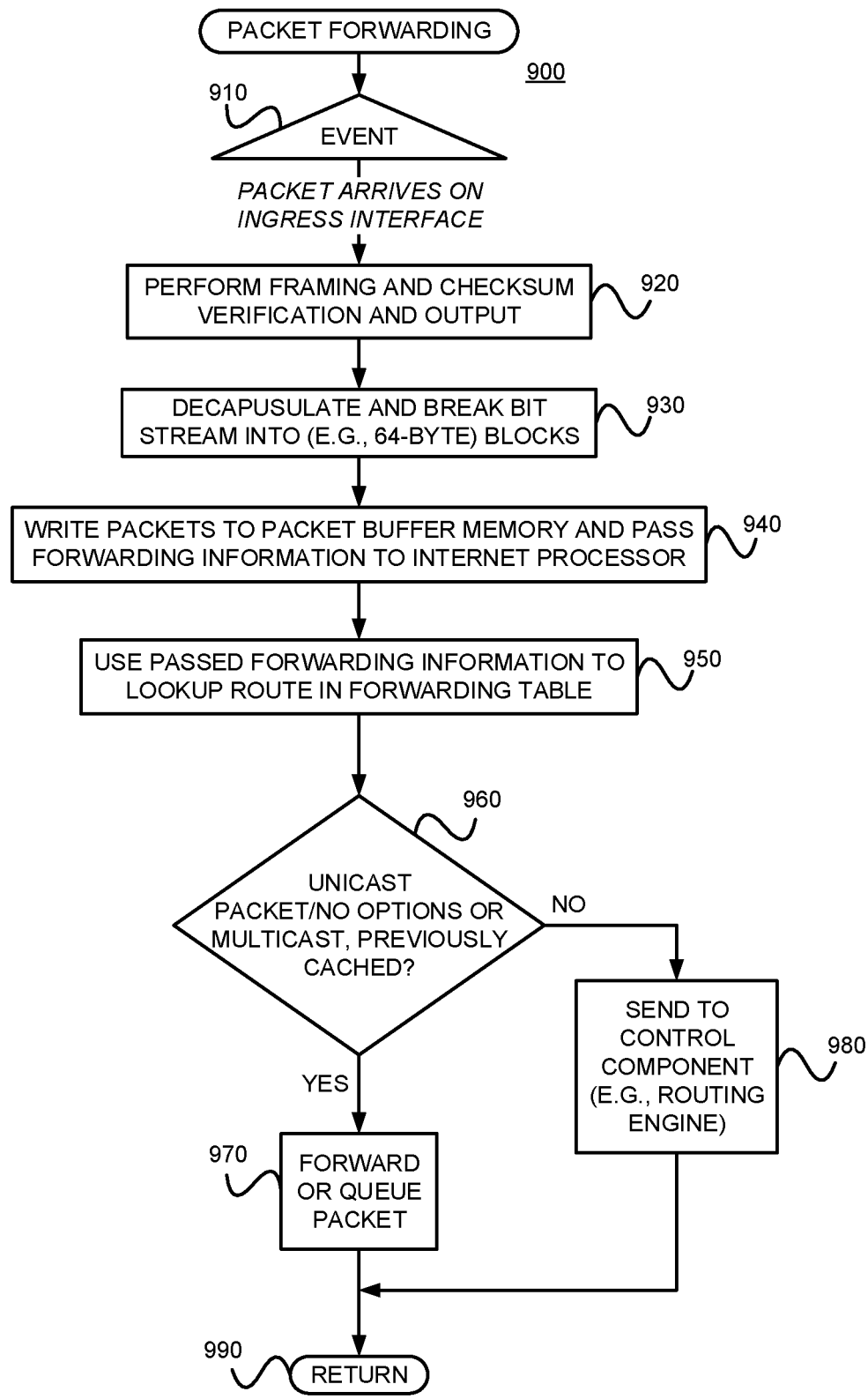
FIG. 9 is a flow diagram of an example packet forwarding method that may be implemented on any of the example routers of FIGS. 6 and 7.

FIG. 9 is a flow diagram of an example method 900 for providing packet forwarding in the example router. The main acts of the method 900 are triggered when a packet is received on an ingress (incoming) port or interface. (Event 910) The types of checksum and frame checks that are required by the type of medium it serves are performed and the packet is output, as a serial bit stream. (Block 920) The packet is then decapsulated and parsed into (e.g., 64-byte) blocks. (Block 930) The packets are written to buffer memory and the forwarding information is passed on the Internet processor. (Block 940) The passed forwarding information is then used to lookup a route in the forwarding table. (Block 950) Note that the forwarding table can typically handle unicast packets that do not have options (e.g., accounting) set, and multicast packets for which it already has a cached entry. Thus, if it is determined that these conditions are met (YES branch of Decision 960), the packet forwarding component finds the next hop and egress interface, and the packet is forwarded (or queued for forwarding) to the next hop via the egress interface (Block 970) before the method 900 is left (Node 990) Otherwise, if these conditions are not met (NO branch of Decision 960), the forwarding information is sent to the control component 610 for advanced forwarding resolution (Block 980) before the method 900 is left (Node 990).

Referring back to block 970, the packet may be queued. Actually, as stated earlier with reference to FIG. 7, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 722 may send a request for the packet to the second DBM ASIC 735b. The DBM ASIC 735 reads the blocks from shared memory and sends them to the I/O manager ASIC 722 on the FPC 720, which then serializes the bits and sends them to the media-specific ASIC of the egress interface. The I/O manager ASIC 715 on the egress PIC 710 may apply the physical-layer framing, perform the CRC, and send the bit stream out over the link.

Referring back to block 980 of FIG. 9, as well as FIG. 7, regarding the transfer of control and exception packets, the system control board 740 handles nearly all exception packets. For example, the system control board 740 may pass exception packets to the control component 610.

Although example embodiments consistent with the present disclosure may be implemented on the example routers of FIG. 5 or 6, embodiments consistent with the present disclosure may be implemented on communications network nodes (e.g., routers, switches, etc.) having different architectures. More generally, embodiments consistent with the present disclosure may be implemented on an example system 1000 as illustrated on FIG. 10.

Figure 10:
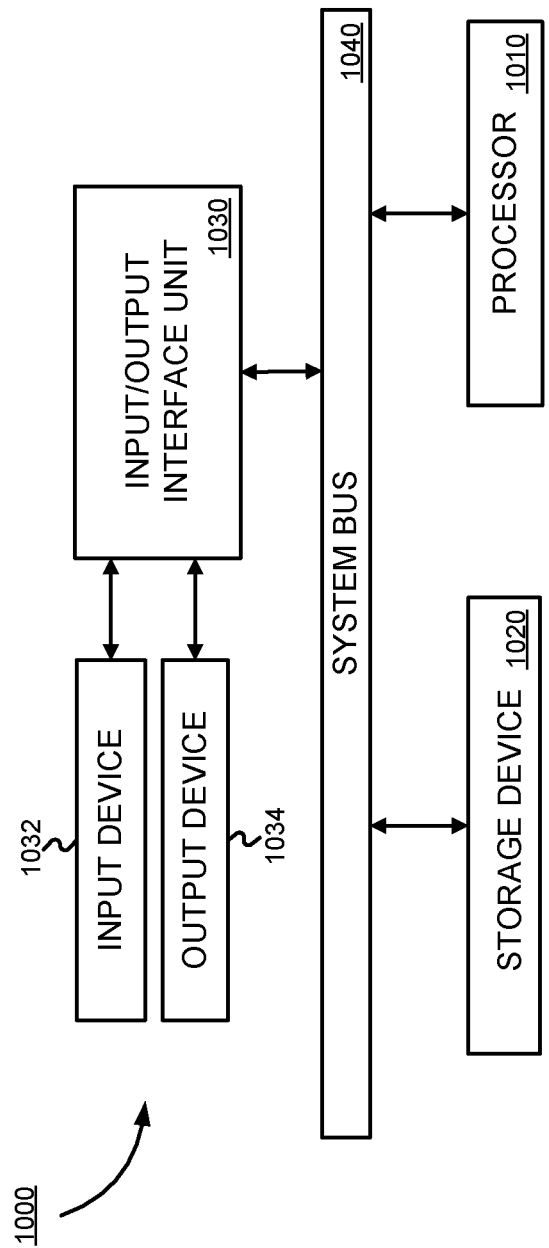
FIG. 10 is a block diagram of an example processor-based system that may be used to execute the example methods described, and/or to store information used and/or generated by such example methods.

FIG. 10 is a block diagram of an exemplary machine 1000 that may perform one or more of the methods described, and/or store information used and/or generated by such methods. The exemplary machine 1000 includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1020 and/or may be received from an external source via one or more input interface units 1030. The machine executable instructions may be stored as various software modules, each module performing one or more operations. Functional software modules are examples of components of the invention.

In some embodiments consistent with the present disclosure, the processors 1010 may be one or more microprocessors and/or ASICs. The bus 1040 may include a system bus. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a software defined network (SDN) controller, a laptop computer, desktop computer, a tablet computer, a mobile phone, or any device that has computing and networking capabilities.

§ 4.3 Refinements, Alternatives and Extensions

Referring back to block 395 of FIG. 3B, although the example method 300b may drop a PIM join/prune message if the maximum PIM join value for an upstream router is exceeded, the downstream router performing the example method 300b may instead store (e.g., buffer) the unsent PIM joins it has received. This will be helpful in sending more PIM joins if the PIM join limit is increased, and/or if existing PIM joins that were previously sent upstream are pruned. In command outputs on the downstream router, for the PIM joins that are not sent to the upstream router, the downstream router can indicate that the PIM joins are not sent upstream because of the PIM join limit set by upstream router. Also, consider a case in which the number of PIM joins is significantly large, but the downstream PIM device still wants to get through the whole database every minute (even if the upstream router has requested a very low PIM join limit that would be exceeded). In such as case, it might be useful to signal a system log. For example, if the database of a router is larger then what the upstream router requests for a limit, then the CE device should intentionally not send some number of PIM joins to this upstream router. In this case, a system log is probably useful because the CE device may have some configuration or some understanding of which PIM joins are the highest priority and signal those.

In some example embodiments, the maximum PIM join value is a maximum count between consecutive PIM Hellos. That is, although not shown in FIGS. 3A and 3B, the count may be updated each time a PIM Hello is received.

Although the maximum PIM join value can be a static (e.g., manually configured) value, this value may be calculated and updated under certain conditions (e.g., periodically, upon expiration of a timer). Thus, an upstream router may determine a number of PIM joins that it can (or is willing to) receive dynamically. This value may be a function of one or more of (A) network load, (B) total number of downstream interfaces, (C) whether there is multi-homing to the upstream PIM device, etc. For example, as the network load increases, the maximum PIM join value may decrease. As another example, if there are more downstream interfaces, or multihoming to the upstream PIM device, the maximum PIM join value may decrease. Thus, if there are two downstream routers on a LAN, then they both could be sending the maximum number of PIM joins to the upstream router (which then exceeds its threshold). Similarly, if an upstream PIM device communicates that it can receive up to "X" number of PIM joins when it has only one downstream PIM neighbor, consider what would happen if that group were to grow to have 1000 downstream PIM neighbors. The value of "X" should be decreased significantly. The upstream PIM device might need some hysteresis to determine the correct maximum value based on its current database. It could then change this value dynamically by sending out a new PIM Hello including a new maximum PIM join value.

Figure 2:
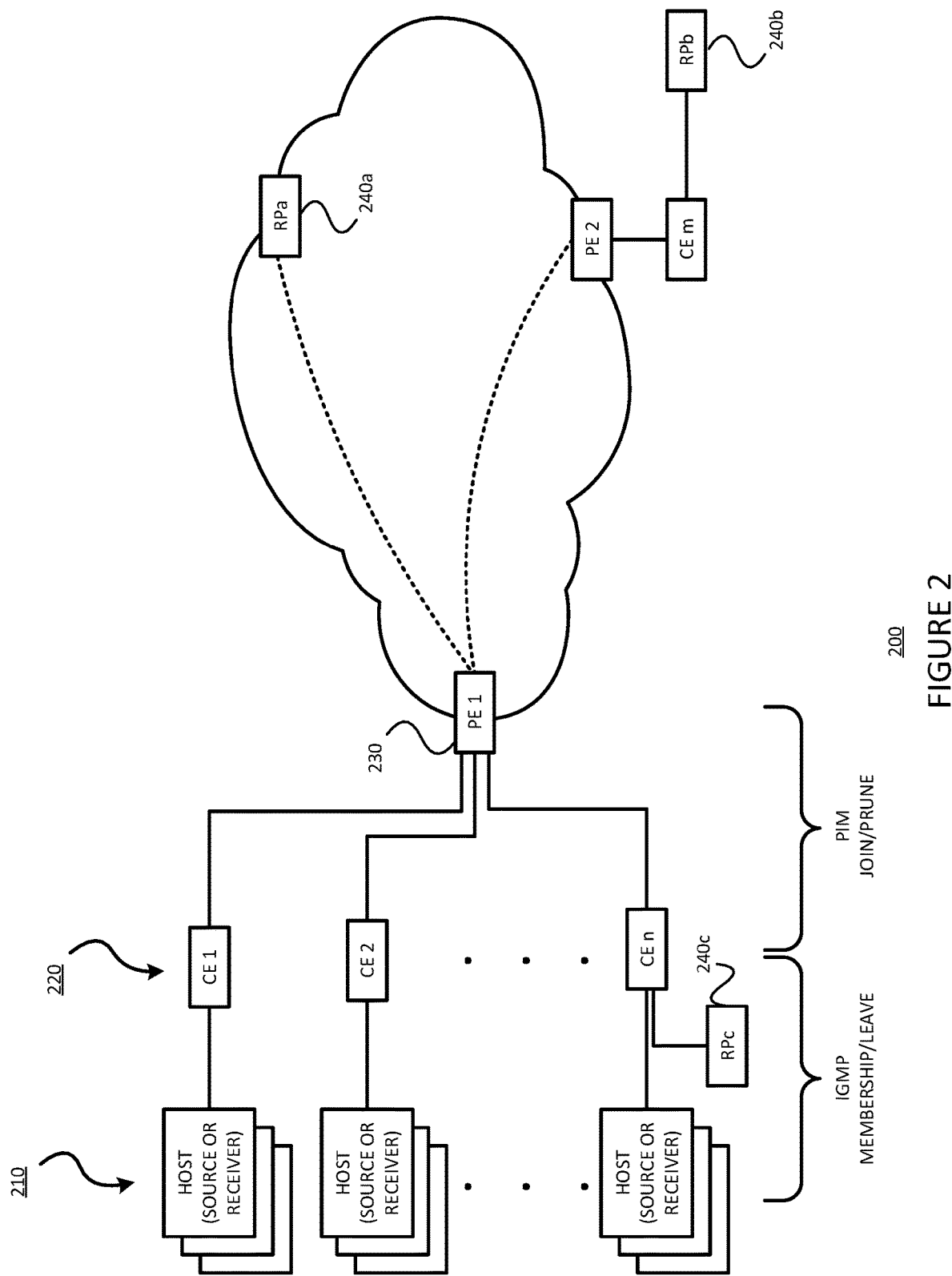
FIG. 2 is an example network used to illustrate a problem addressed by the present description.

Referring back to FIG. 2 for example, an upstream PIM device (e.g., PE1) can communicate different maximum PIM join values to different downstream PIM neighbor devices (e.g., CE1, CE2, . . . . CEn). This is useful because a service provider can offer different levels of service to different customers by using different maximum PIM join values.

Thus, for example, consider a router that can handle 100 unique PIM joins. If it has only one downstream PIM neighbor, it can inform the downstream neighbor of a maximum PIM join value of 100. If it has two downstream PIM neighbors, it can inform each of the downstream neighbors of a maximum PIM join value of 50. However, if it wants to offer differentiated services, it may inform one of the downstream neighbors of a higher maximum PIM join value (e.g., 90, 80, 75, etc.), and inform the other of the downstream neighbors of a lower maximum PIM join value (e.g., 10, 20, 25, etc., respectively).

§ 4.4 Example of Operations of Example Method

Referring back to FIG. 2, assume that PE 1 230 sends a maximum PIM join message value (e.g., in a PIM Hello packet) to one or more of the CEs 220. Assume that each of the CEs receives IGMP report/leave message(s) from hosts (e.g., on a shared Layer 2 network, such as Ethernet). Responsive to receiving an IGMP report/leave message(s) (Recall, e.g., the right branch of event 360 of FIG. 3B.), each CE 220 now knows the number of unique PIM joins which it can send in PIM join/prune message(s) towards PE 1 230, so PIM joins/prunes are throttled at each of the CEs 220. In this way, network administrators can avoid a potential PIM join/prune message flood, and control the resource usage on routers (e.g., on PE 1).

Although the meaning of a number of unique PIM joins in one or more PIM join/prune message(s) can be understood from the foregoing description, it may be better understood with the following simple example. Consider the following sequence of PIM join/prune messages (including PIM joins only) sent from a given downstream router to a given upstream router:
- at time 1, PIM join/prune message {G=Group 1; $S_1$=*};
- at time 2, PIM join/prune message {G=Group 1; $S_1$=1, $S_2$=3, $S_3$=7}

So, in these two PIM join/prune messages, there are four unique PIM joins {(*,1), (1,1), (3,1) and (7,1)}. Assume the following PIM join/prune messages (include PIM joins only) are sent from the given downstream router to the given upstream router:
- at time 3, PIM join/prune {G=Group 5; $S_1$=*};
- at time 4, PIM join/prune {G=Group 2, $S_1$=1, $S_2$=2; G=Group 4, $S_1$=*}; and
- at time 5, PIM join/prune {G=Group 5; $S_1$=9}.

So now, in the five PIM join/prune messages, there are nine PIM joins {(*,1), (1,1), (3,1), (7,1), (*,5), (1,2), (2,2), (*,4) and (9.5)}. Finally, assume that the following PIM join/prune message (including PIM prunes only) is sent from the given downstream router to the given upstream router:
- at time 6, PIM join/prune {G=Group 2, $S_1$=1, $S_2$=2}.

Now, in six PIM join/prune messages, there are seven PIM joins {(*,1), (1,1), (3,1), (7,1), (*,5), (*,4) and (9.5)}.

§ 4.5 Conclusions

As should be appreciated from the foregoing, using example embodiments consistent with the present description, a new PIM Option encoding a maximum number of unique PIM joins (corresponding to unique (S,G) combinations) in one or more PIM join messages can be included (e.g., as an option TLV) in PIM hello message. This informs a downstream neighbor on how many unique PIM joins the upstream neighbor can (or is willing to) receive and/or process. The maximum PIM join number can be a configured. It may be a static value, manually configured. Alternatively, it may be a calculated value that may be determined dynamically. This way, in a scaled scenarios on a PE, if a customer has to restrict the number of PE-CE PIM joins, they can do so without causing the PIM neighborship to flap since the CE is informed about the maximum number of unique PIM joins that it can send to the upstream PE neighbor. This will enable the administrator to have control over the number of PIM joins in their network.

What is claimed is:

1. A computer-implemented method for use on a device running a protocol independent multicast (PIM) protocol, the computer-implemented method comprising:
   a) receiving PIM join control limit configuration information, wherein the PIM group control limit is a maximum number of unique PIM (source, group) combinations that are to be carried in one or more PIM join/prune messages;
   b) storing the received PIM join control limit configuration information;
   c) generating a PIM Hello message including the stored PIM join control limit configuration information; and
   d) sending the generated PIM Hello message to a PIM neighbor.

2. The computer-implemented method of claim 1 wherein the PIM neighbor is downstream from the device.

3. The computer-implemented method of claim 1 wherein the stored PIM join control limit configuration information is included in the PIM Hello message as a type-length-value (TLV).

4. The computer-implemented method of claim 1, further comprising:
   e) receiving second PIM join control limit configuration information, wherein the second PIM join control limit configuration is a value which is different than the PIM join control limit configuration information;
   f) storing the received second PIM join control limit configuration information;
   g) generating a second PIM Hello message including the stored second PIM join control limit configuration information; and
   h) sending the generated second PIM Hello message to a second PIM neighbor different than the PIM neighbor.

5. The computer-implemented method of claim 4 wherein the PIM join control limit is a maximum unique PIM join value, and wherein the second PIM join control limit is a second maximum unique PIM join value.

6. The computer-implemented method of claim 4 wherein the device is a provider edge router, the PIM neighbor is a first customer edge router and the second PIM neighbor is a second customer edge router.

7. The computer-implemented method of claim 1 wherein the device is a provider edge router and the PIM neighbor is a customer edge router.

8. The computer-implemented method of claim 1, further comprising:
   e) receiving, by the PIM neighbor, the generated PIM Hello message;
   f) receiving, by the PIM neighbor, one or more IGMP messages;
   g) generating, using information in the one or more IGMP messages, at least one PIM join/prune message, wherein a number of unique PIM joins, in the generated at least one PIM join/prune message and any earlier PIM join/prune messages sent from the PIM neighbor to the device, is limited by the PIM join control limit; and
   h) sending the generated at least one PIM join/prune message from the PIM neighbor to the PIM device.

9. A system including a device running a protocol independent multicast (PIM) protocol, the device comprising:
   a) at least one communication interface;
   b) at least one processor; and
   c) a storage device storing processor-executable instructions which, when executed by the at least one processor, cause the at least one processor to perform a method including
      1) receiving PIM join control limit configuration information, wherein the PIM group control limit is a maximum number of unique PIM (source, group) combinations that are to be carried in one or more PIM join/prune messages,
      2) storing, on the storage device, the received PIM join control limit configuration information,
      3) generating a PIM Hello message including the stored PIM join control limit configuration information, and
      4) sending, via the at least one communication interface, the generated PIM Hello message to a PIM neighbor.

10. The system of claim 9 including the PIM neighbor, wherein the PIM neighbor is downstream from the device.

11. The system of claim 9 wherein the stored PIM join control limit configuration information is included in the PIM Hello message as a type-length-value (TLV).

12. The system of claim 9 wherein the method further includes
   5) receiving second PIM join control limit configuration information, wherein the second PIM join control limit configuration is a value which is different than the PIM join control limit configuration information,
   6) storing, on the storage device, the received second PIM join control limit configuration information,
   7) generating a second PIM Hello message including the stored second PIM join control limit configuration information, and
   8) sending, via the at least one communication interface, the generated second PIM Hello message to a second PIM neighbor different than the PIM neighbor.

13. The system of claim 12 wherein the PIM join control limit is a maximum unique PIM join value, and wherein the second PIM join control limit is a second maximum unique PIM join value.

14. The system of claim 12 wherein the device is a provider edge router, the PIM neighbor is a first customer edge router and the second PIM neighbor is a second customer edge router.

15. The system of claim 9 wherein the device is a provider edge router and the PIM neighbor is a customer edge router.

16. The system of claim 9 further including the PIM neighbor, the PIM neighbor comprising:
   a) at least one communication interface;
   b) at least one processor; and
   c) a storage device storing processor-executable instructions which, when executed by the at least one processor of the PIM neighbor, cause the at least one processor of the PIM neighbor to perform a method including
      1) receiving, via the at least one communication interface of the PIM neighbor, the generated PIM Hello message;
      2) receiving, by the at least one communication interface of the PIM neighbor, one or more IGMP messages;
      3) generating, by the PIM neighbor, using information in the one or more IGMP messages, at least one PIM join/prune message, wherein a number of unique PIM joins, in the generated at least one PIM join/prune message and any earlier PIM join/prune messages sent from the PIM neighbor to the device, is limited by the PIM join control limit; and
      4) sending, via the at least one communication interface of the PIM neighbor, the generated at least one PIM join/prune message from the PIM neighbor to the PIM device.

17. A computer-readable, non-transitory, storage device storing processor-executable instructions which, when executed by at least one processor, cause the at least one processor to perform a method including:
   a) receiving PIM join control limit configuration information, wherein the PIM group control limit is a maximum number of unique PIM (source, group) combinations that are to be carried in one or more PIM join/prune messages;
   b) storing the received PIM join control limit configuration information;
   c) generating a PIM Hello message including the stored PIM join control limit configuration information; and
   d) sending the generated PIM Hello message to a PIM neighbor.

18. The computer-readable, non-transitory, storage device of claim 17 wherein the method further includes:
   e) receiving second PIM join control limit configuration information, wherein the second PIM join control limit configuration is a value which is different than the PIM join control limit configuration information;
   f) storing the received second PIM join control limit configuration information;
   g) generating a second PIM Hello message including the stored second PIM join control limit configuration information; and
   h) sending the generated second PIM Hello message to a second PIM neighbor different than the PIM neighbor.

19. The computer-readable, non-transitory, storage device of claim 17 wherein the PIM neighbor is downstream from the device.

20. The computer-readable, non-transitory, storage device of claim 17 wherein the stored PIM join control limit configuration information is included in the PIM Hello message as a type-length-value (TLV).

* * * * *